(12) United States Patent
Lafferty et al.

(10) Patent No.: US 9,925,900 B2
(45) Date of Patent: Mar. 27, 2018

(54) VEHICLE SEAT CUSHION

(71) Applicant: Faurecia Automotive Seating, LLC, Troy, MI (US)

(72) Inventors: Lola Lafferty, Capac, MI (US); Raghvendra T Joshi, Windsor (CA); John M Perraut, Rochester Hill, MI (US)

(73) Assignee: Faurecia Autmotive Seating, LLC, Troy, MI (US)

( * ) Notice: Subject to any disclaimer, the term of this patent is extended or adjusted under 35 U.S.C. 154(b) by 312 days.

(21) Appl. No.: 14/830,974

(22) Filed: Aug. 20, 2015

(65) Prior Publication Data

US 2016/0052432 A1 Feb. 25, 2016

Related U.S. Application Data

(60) Provisional application No. 62/039,678, filed on Aug. 20, 2014.

(51) Int. Cl.
*B60N 2/56* (2006.01)

(52) U.S. Cl.
CPC .............................. *B60N 2/5685* (2013.01)

(58) Field of Classification Search
CPC .................................................. B60N 2/5685
USPC ..................................................... 297/180.12
See application file for complete search history.

(56) References Cited

U.S. PATENT DOCUMENTS

| | | | | |
|---|---|---|---|---|
| 2,712,592 A | * | 7/1955 | Goldstein | H05B 3/342 297/180.12 |
| 6,341,504 B1 | | 1/2002 | Istook | |
| 2009/0001778 A1 | * | 1/2009 | Nathan | B60N 2/5685 297/180.12 |
| 2009/0051196 A1 | * | 2/2009 | Ishii | H05B 3/146 297/180.12 X |
| 2015/0266405 A1 | * | 9/2015 | Fitzpatrick | B60N 2/5685 297/180.12 |

FOREIGN PATENT DOCUMENTS

| | | |
|---|---|---|
| DE | 10342787 A1 | 5/2004 |
| WO | 2004097089 A1 | 11/2004 |

* cited by examiner

*Primary Examiner* — Anthony D Barfield
(74) *Attorney, Agent, or Firm* — Barnes & Thornburg LLP

(57) ABSTRACT

A vehicle seat includes a seat pad. The seat pad includes a foam cushion and a cushion cover arranged to extend around and cover the foam cushion.

19 Claims, 17 Drawing Sheets

VEHICLE SEAT CUSHION

PRIORITY CLAIM

This application claims priority under 35 U.S.C. § 119(e) to U.S. Provisional Application Ser. No. 62/039,678, filed Aug. 20, 2014, which is expressly incorporated by reference herein.

BACKGROUND

The present disclosure relates to a vehicle seat, and particularly to a seat cushions included in seat bottoms and seat backs of vehicle seat. More particularly, the present disclosure relates to a seat cushion configured to provide heat to an occupant resting on the vehicle seat.

SUMMARY

According to the present disclosure, a vehicle seat includes a seat pan, a cushion, and a cushion cover. The cushion is coupled to the seat pan and the cushion cover is arranged to extend around and cover the cushion.

In illustrative embodiments, the cushion cover includes an upholstery sheet, a foam sheet, and a thermal sheet. The upholstery sheet is located in spaced-apart relation to the cushion. The foam sheet is located between the cushion and the upholstery sheet. The thermal sheet is located between the upholstery sheet and the foam sheet and is configured to provide means for supplying heat to an occupant supported by the vehicle seat in response to supplying a minimal amount of current to the thermal sheet so that an amount of time required for the occupant to sense that heat being communicated to the occupant through the foam sheet and the upholstery sheet is minimized In illustrative embodiments, the thermal-reinforcement layer includes a scrim, a plurality of conductive threads woven through the scrim, and an input electrical bus bar woven through the scrim. The input electrical bus bar is arranged to interconnect the plurality of conductive threads to a power source so that each conductive thread is supplied power in parallel to every other conductive thread.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a vehicle seat in accordance with the present disclosure showing that the vehicle seat includes a heated seat cushion that is configured to provide heat to an occupant sitting on the vehicle seat while minimizing time required for the occupant to sense that heat is being applied while current applied to the heated seat cushion from the power source is minimized;

FIG. 2 is a sectional view taken along line 2-2 of FIG. 1 showing that the heated seat cushion includes, from top to bottom, seat-cushion trim including an upholstery layer, a thermal reinforcement layer including a reinforcing scrim and several parallel conductive threads woven into the reinforcing scrim and arranged to extend between an input electrical bus and an output electrical bus located in the reinforcing scrim, and a foam layer, and a foam pad;

FIG. 3 is an enlarged plan view taken from the circled region of FIG. 2 showing the thermal-reinforcement layer including a woven scrim, the conductive thread woven through the thermal-reinforcement layer at a top-left portion of FIG. 2 and the input electrical bus running down the left-hand side of FIG. 2;

FIG. 4 is a diagrammatic view of the seat cushion of FIG. 1 showing that the seat cushion includes the seat-cushion trim including the upholstery layer, the thermal-reinforcement layer including the reinforcing scrim, conductive threads woven through the reinforcing scrim, the input bus bar woven into the scrim, and the output bus bar woven into the scrim, and the foam layer, and the foam pad and suggesting that the thermal-reinforcement layer is provided power from a power source controlled by a controller;

Figure 1:
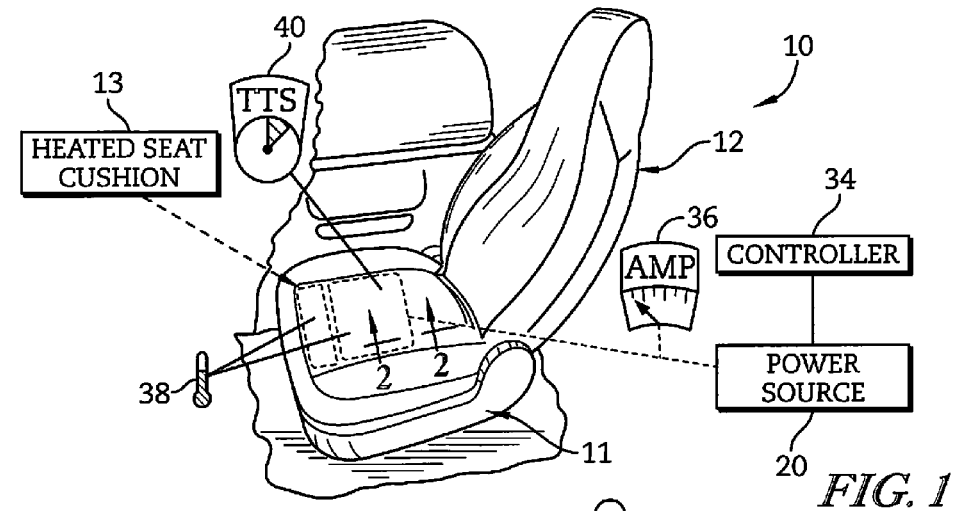
Figure 7:
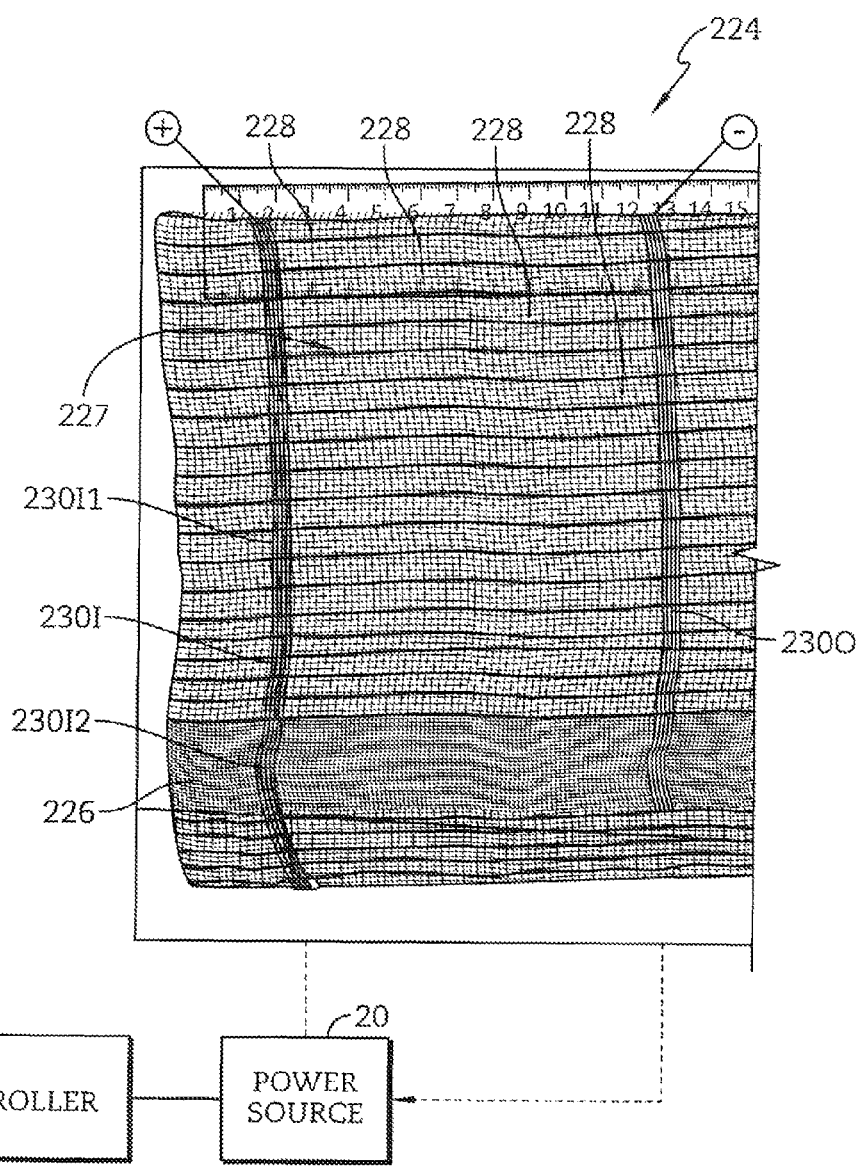
Figure 8:
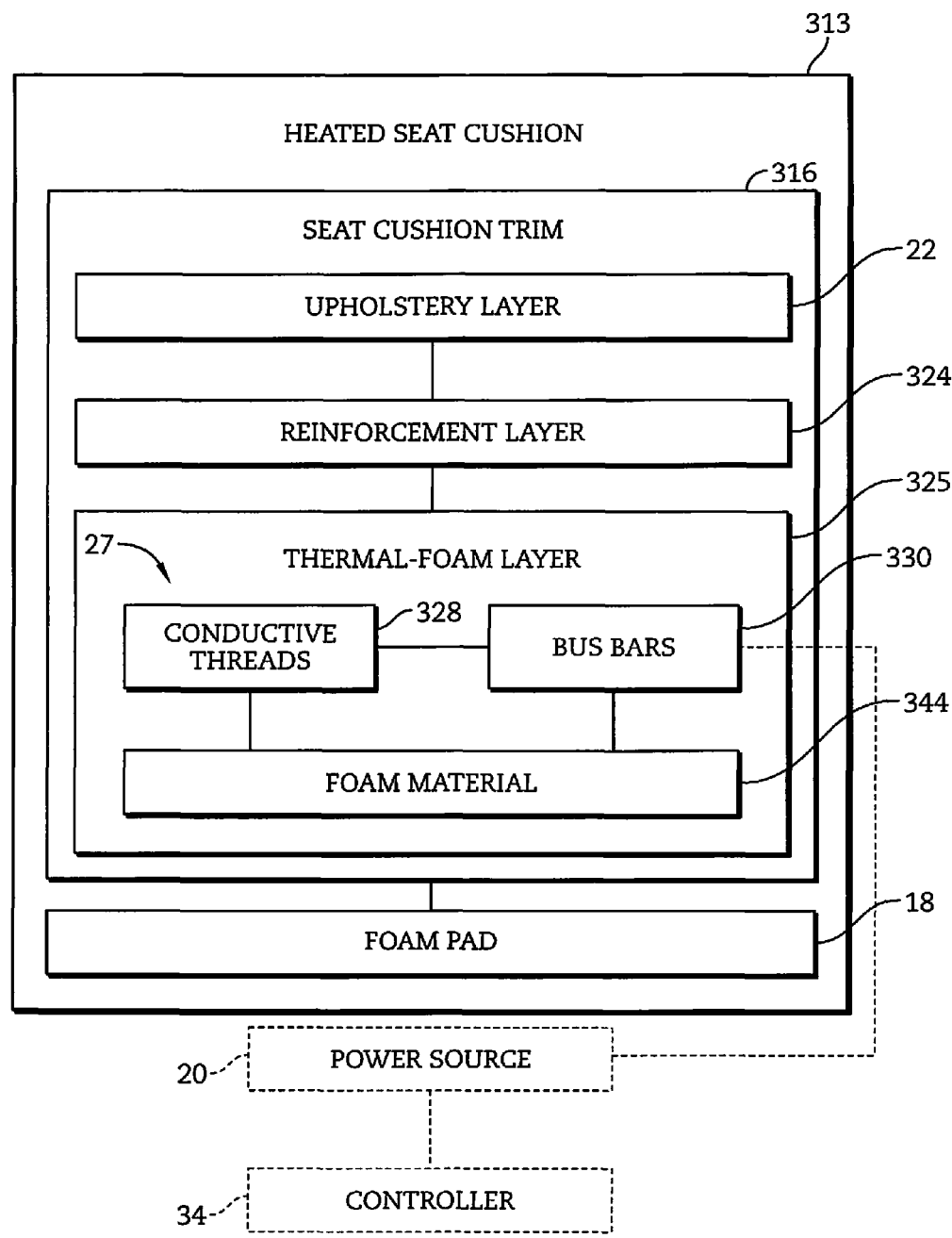
Figure 9:
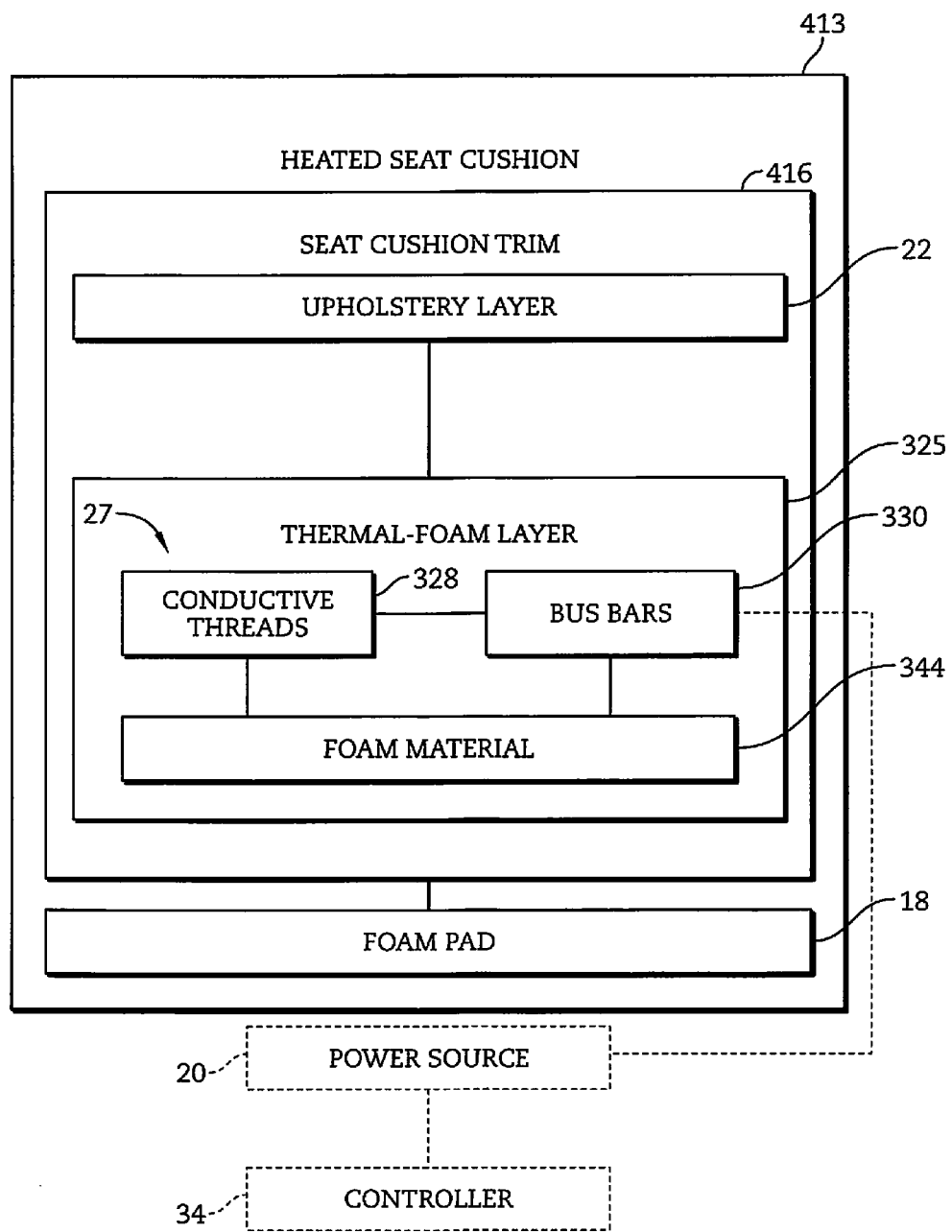
Figure 10:
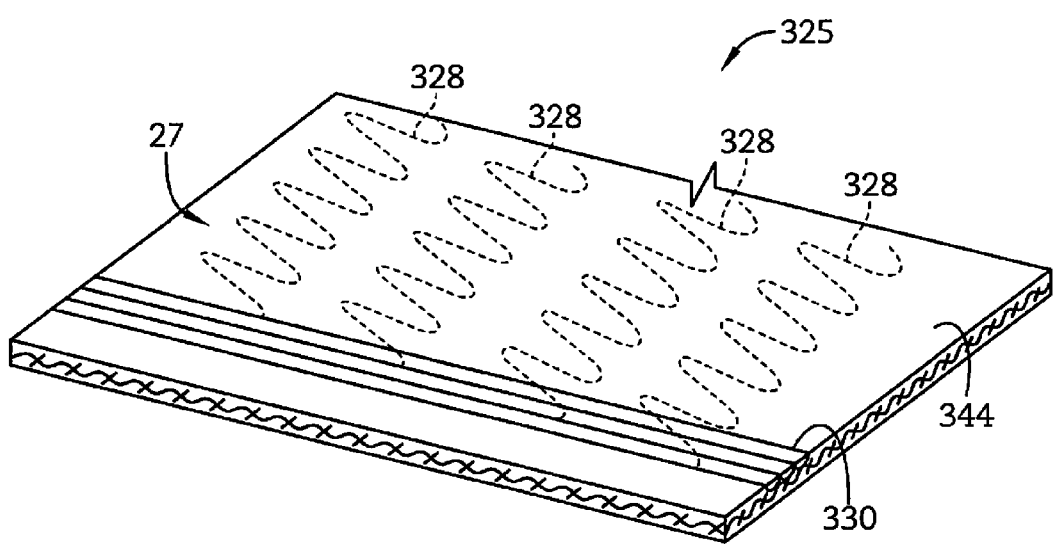
Figure 11:
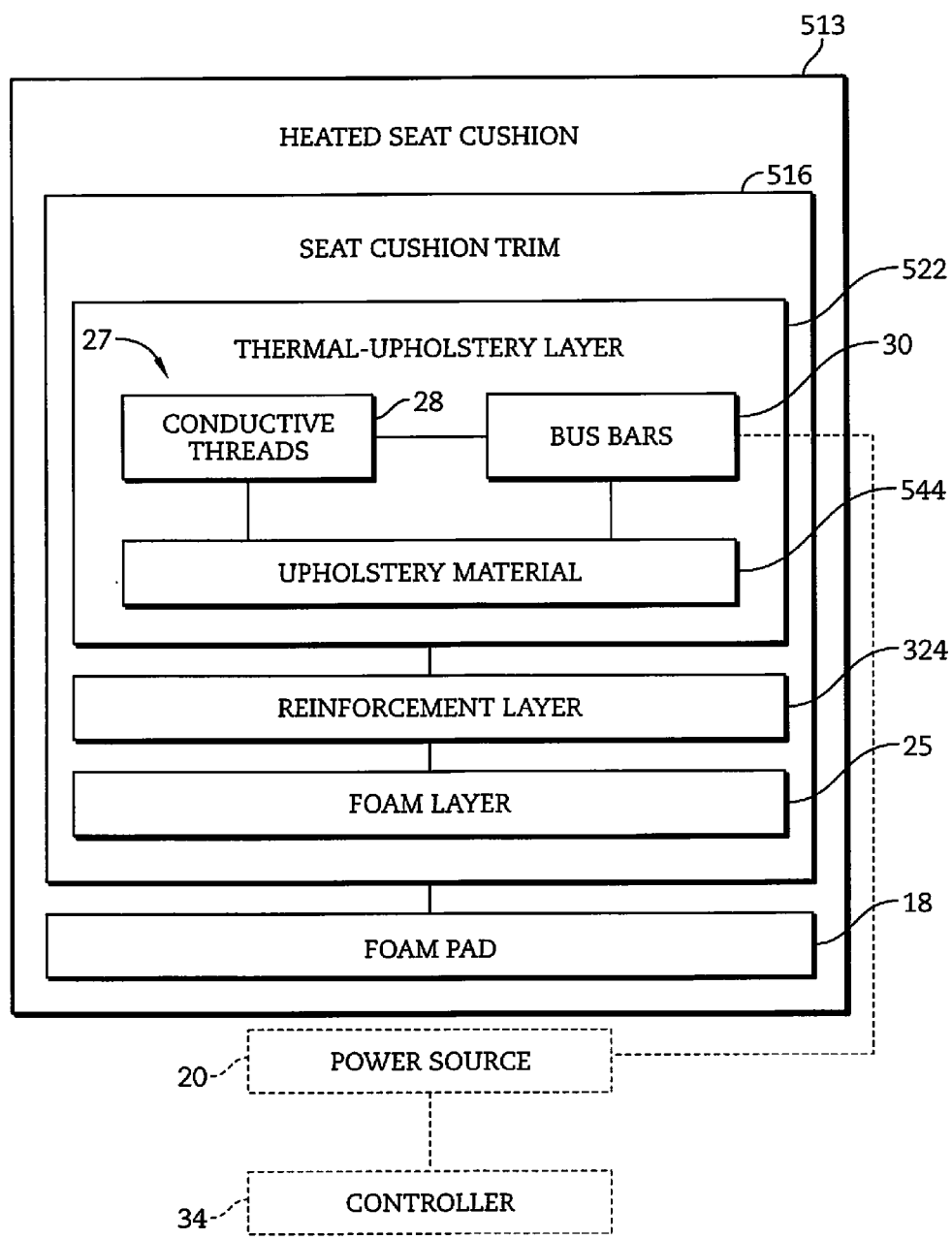
Figure 12:
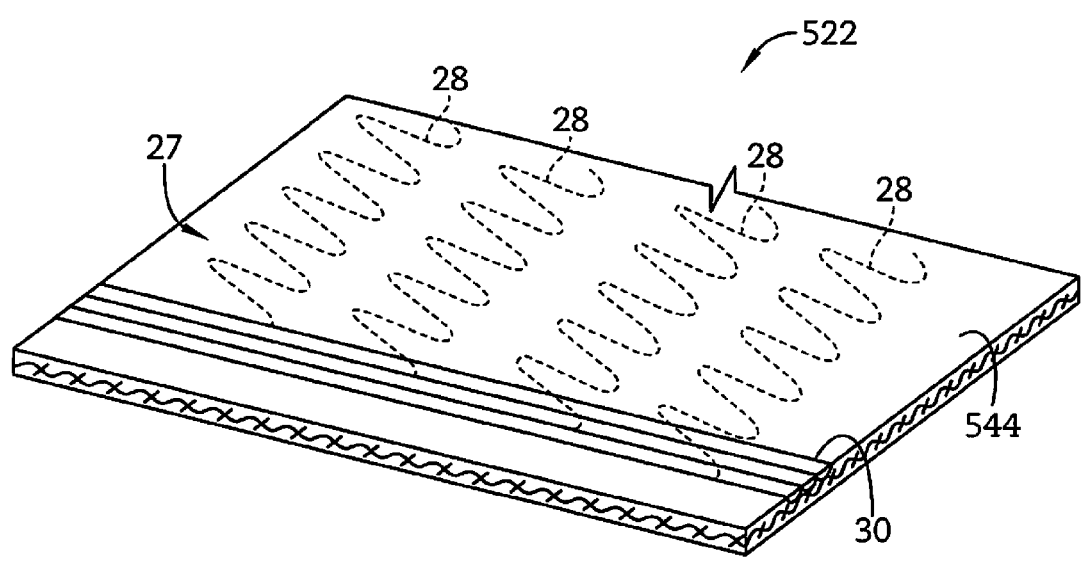
Figures 13, 14:
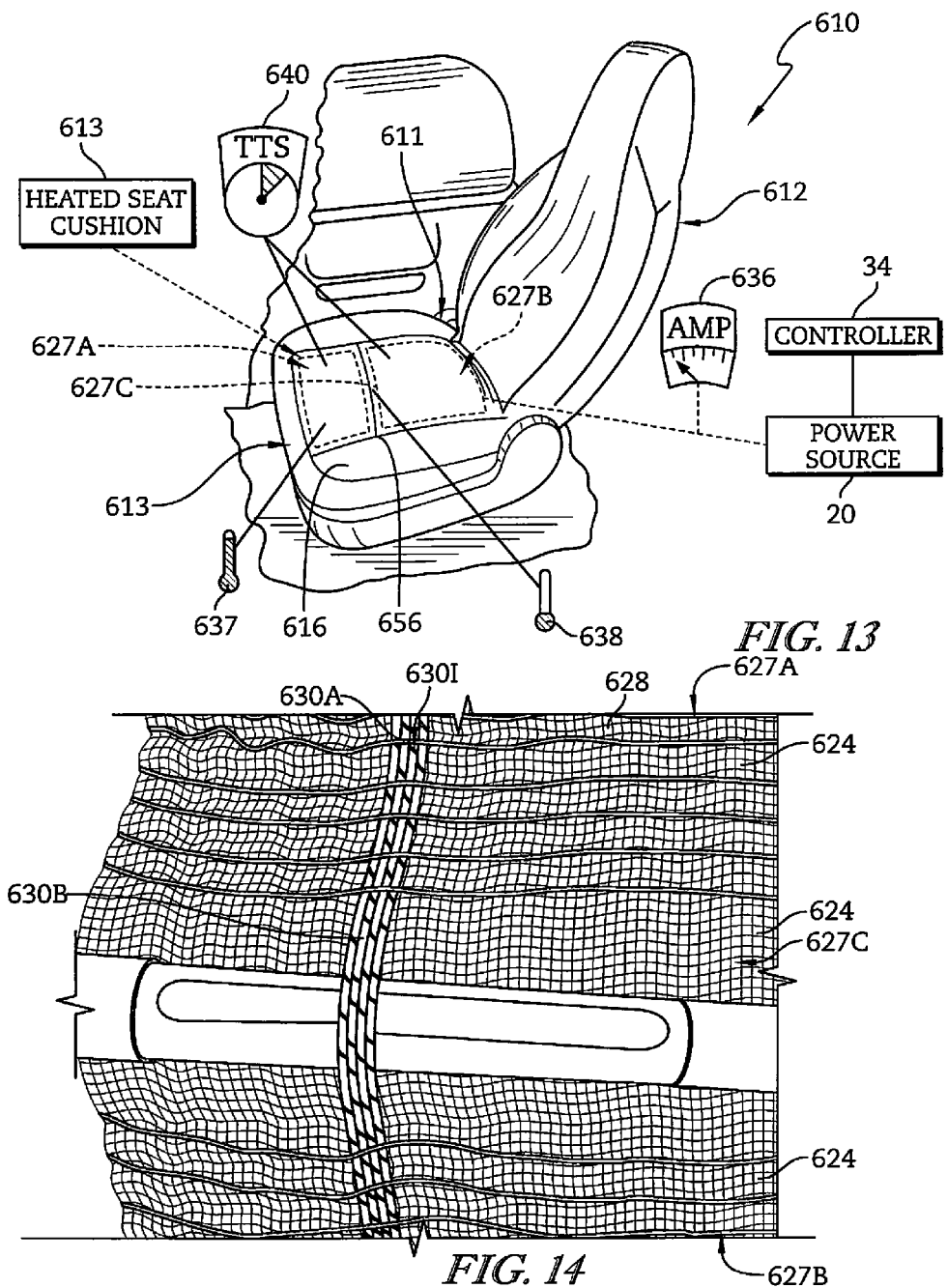
Figure 15:
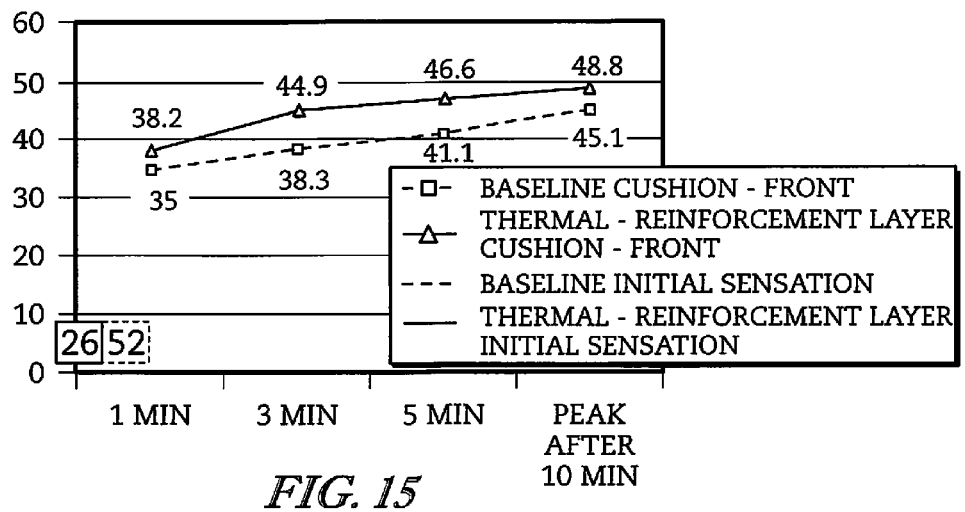
Figure 16:
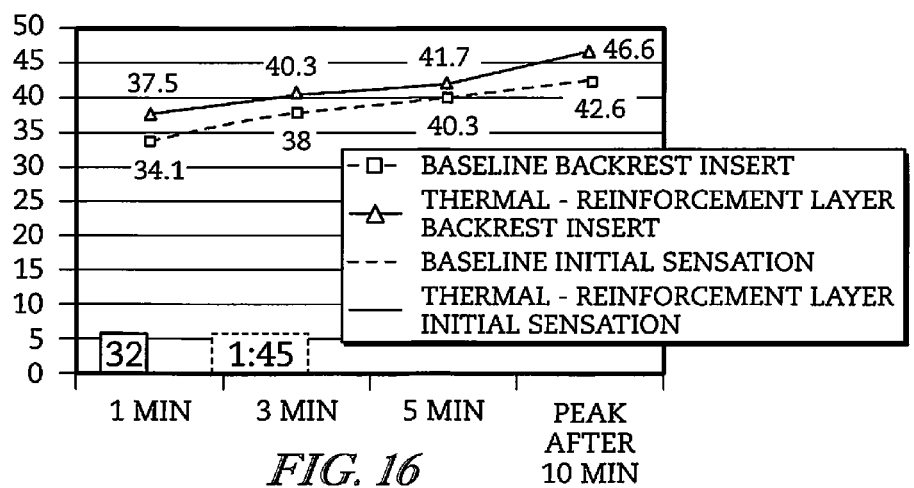
Figure 17:
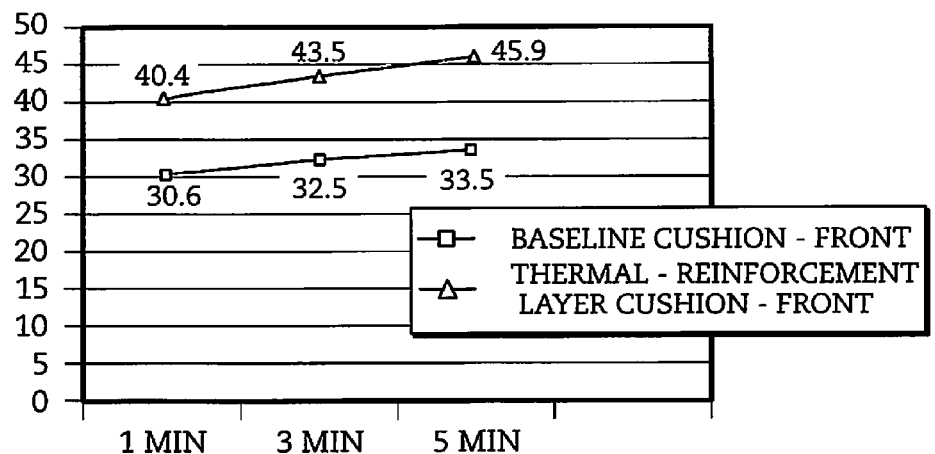
Figure 18:
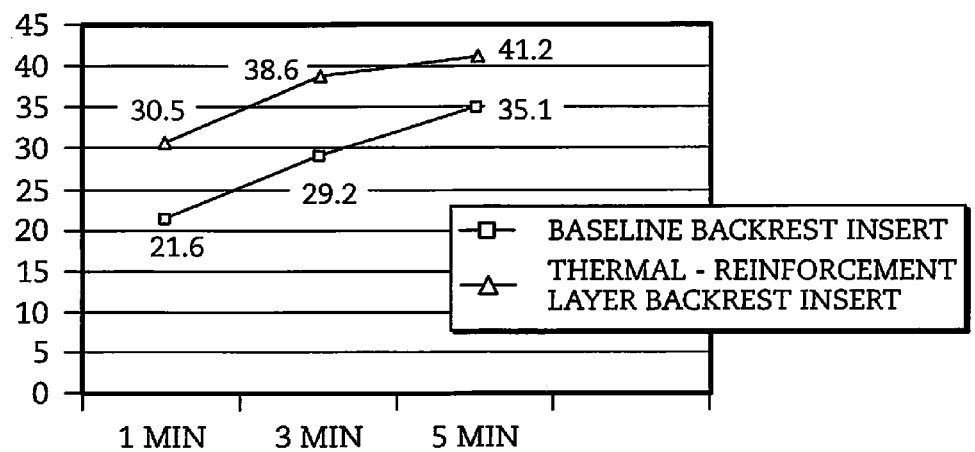
Figure 19:
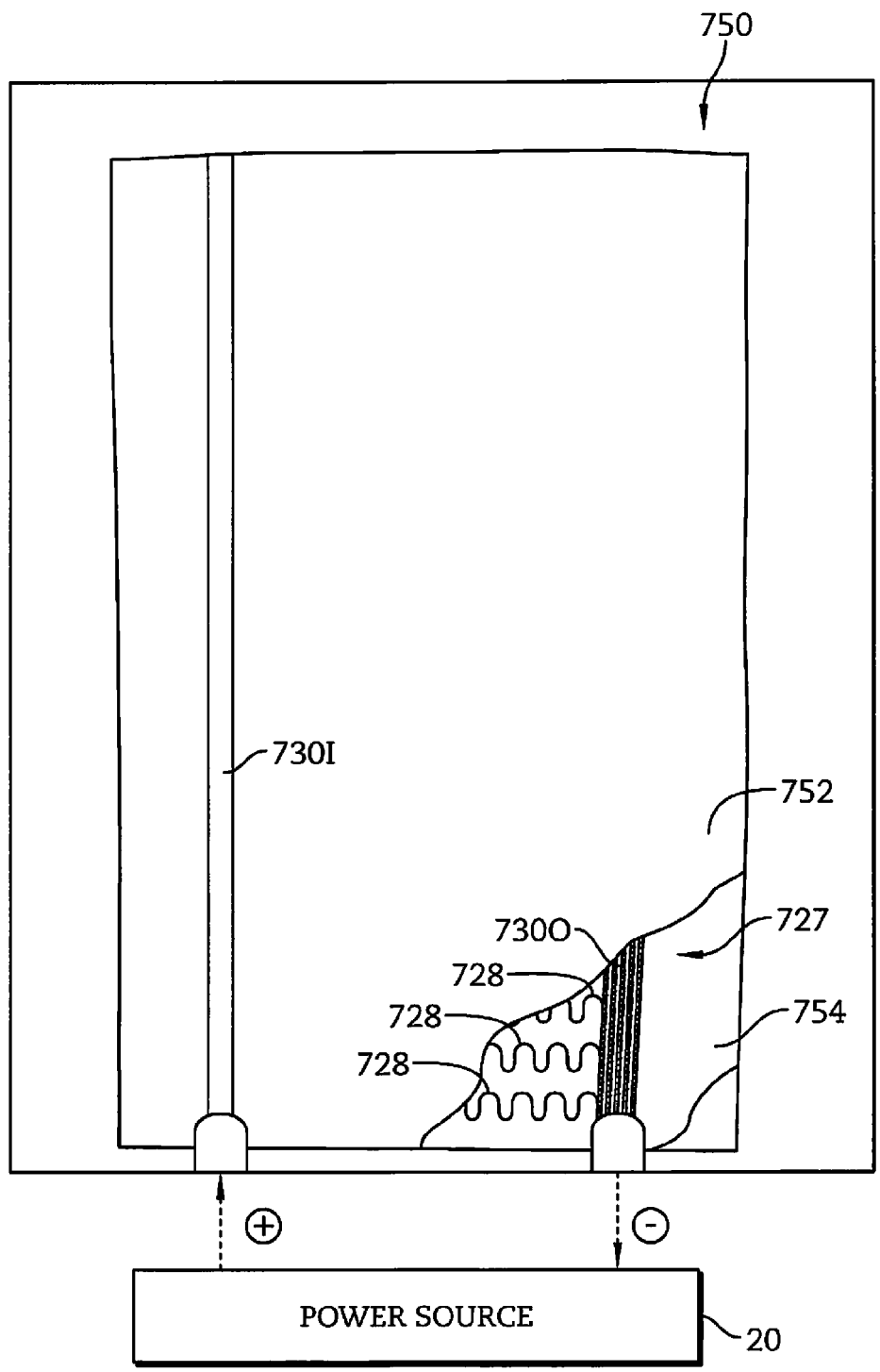
Figure 19A:
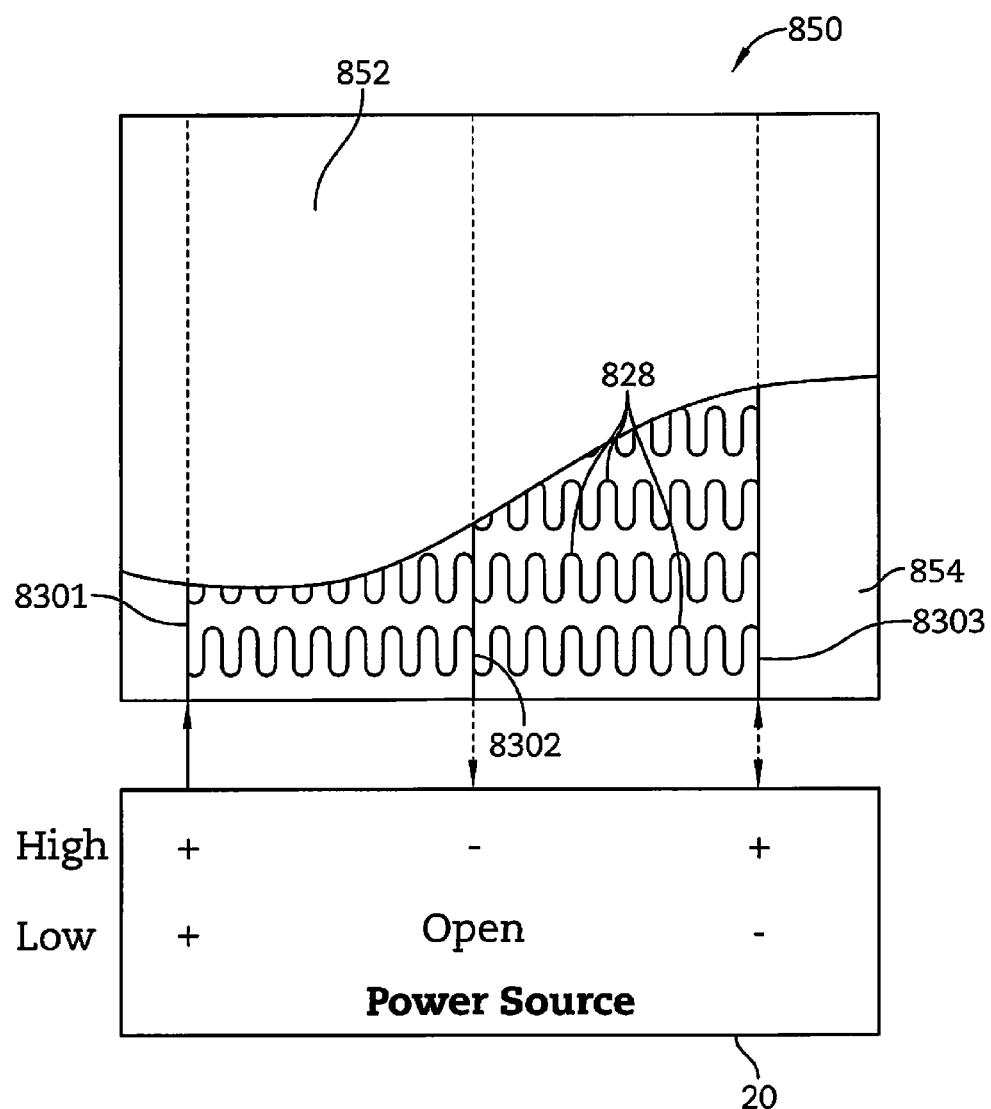
Figure 20:
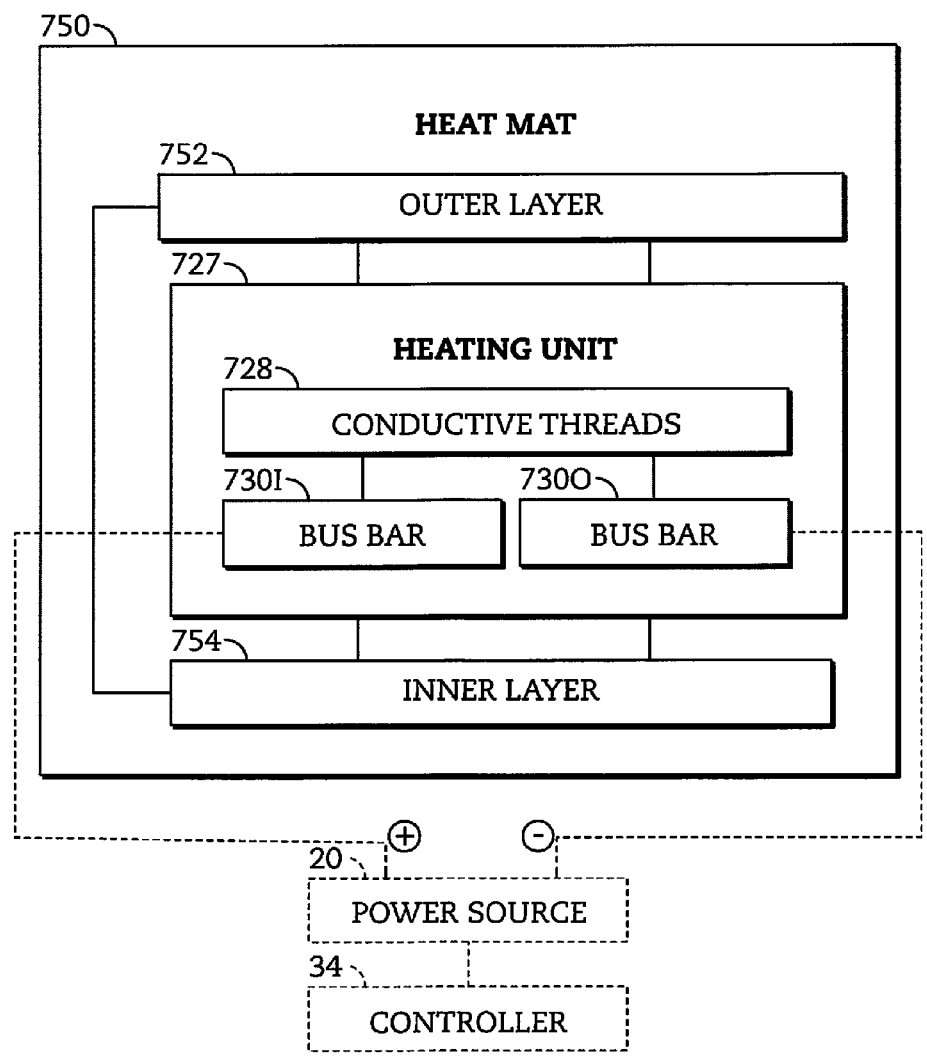
Figure 21:
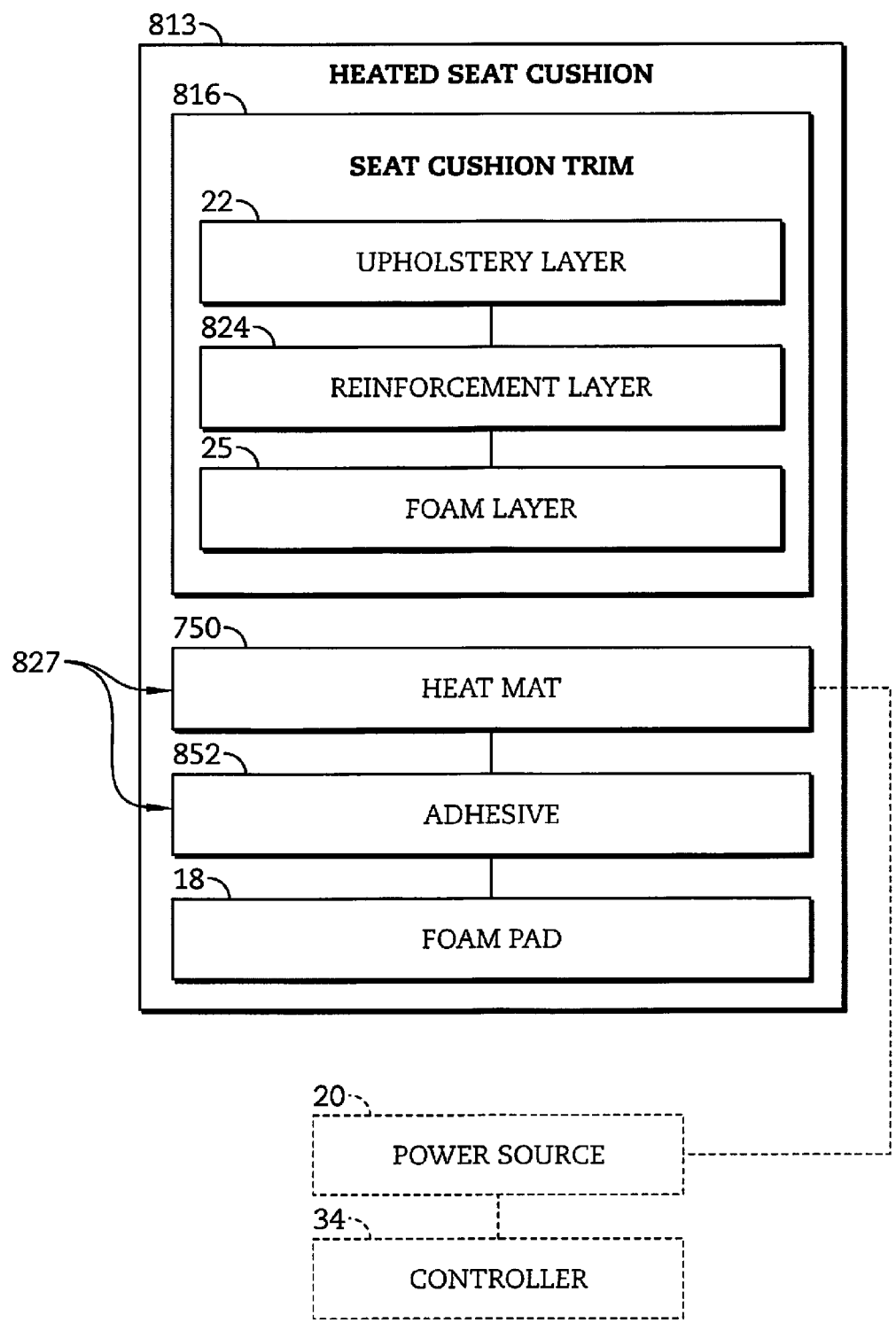

FIG. 7 is a photograph of a thermal-reinforcement layer in accordance with the present disclosure showing that the thermal-reinforcement layer includes a reinforcement scrim, an input bus running along on a left side of the reinforcement scrim, an output bus woven along a right side of the reinforcement scrim, and several conductive threads extending between the buses and woven through the reinforcement scrim;

FIG. 8 is a diagrammatic view of another embodiment of a heated seat cushion in accordance with the present disclosure showing that the heated seat cushion includes seat-cushion trim including an upholstery layer, a reinforcement layer, a thermal-foam layer including foam material, conductive threads coupled to the foam material, and bus bars coupled to the foam material, and the foam pad and suggesting that the thermal-foam layer is provided power from a power source controlled by a controller;

FIG. 9 is a diagrammatic view of another embodiment of a heated seat cushion in accordance with the present disclosure showing that the heated seat cushion includes seat-cushion trim including an upholstery layer and a thermal-foam layer including foam material, conductive threads coupled to the foam material, and bus bars coupled to the foam material and the foam pad and suggesting that the thermal-foam layer is provided power from a power source controlled by a controller;

FIG. 10 is a diagrammatic view of a portion of the foam-reinforcement layer of FIGS. 8 and 9;

FIG. 11 is a diagrammatic view of another embodiment of a heated seat cushion in accordance with the present disclosure showing that the heated seat cushion includes seat-cushion trim including a thermal-upholstery layer including an upholstery material, conductive threads coupled to the upholstery material, and bus bars coupled to the upholstery material, a reinforcement layer, the foam layer, and the foam pad and suggesting that the thermal-upholstery layer is provided power from a power source controlled by a controller;

FIG. 12 is a diagrammatic view of a portion of the thermal-upholstery layer of FIG. 11;

FIG. 13 is a perspective and diagrammatic view of another embodiment of a vehicle seat in accordance with the present disclosure showing that the vehicle seat includes a heated seat cushion extending between a seat bottom and a seat back of the vehicle seat and that the heated seat cushion is configured to provide heat to an occupant sitting on the vehicle seat while using a minimal amount of current from a power source;

FIG. 14 is an enlarged plan view of a thermal-reinforcement layer included in the heated seat cushion of FIG. 13 showing that the thermal-reinforcement layer includes a woven scrim, conductive threads woven through an upper portion of the scrim and a input electrical bus running down the scrim with a portion of the input electrical bus being separated from the scrip as suggested by the ink pen being located between the portion of the input electrical bus and the woven scrim;

FIG. 15 is a graph showing the temperature of the heated seat cushion of FIG. 1 located in a seat bottom over time in comparison with a baseline heated seat cushion while load is applied to the seat cushion;

FIG. 16 is a graph showing the temperature of the heated seat cushion of FIG. 1 located in a seat back over time in comparison with the baseline heated seat cushion while load is applied to the seat cushion;

FIG. 17 is a graph showing the temperature of the heated seat cushion of FIG. 1 located in the seat bottom over time in comparison with the baseline heated seat cushion without load being applied to the seat cushion;

FIG. 18 is a graph showing the temperature of the heated seat cushion of FIG. 1 located in the seat back over time in comparison with the baseline heated seat cushion without load being applied to the seat cushion;

FIG. 19 is a perspective and diagrammatic view of a heat mat in accordance with the present disclosure with portions broken away to reveal that the heat pad includes an upper layer, a heating element including an input bus bar, several parallel conductive threads, and an output bus bar, and a lower layer;

FIG. 19A is a perspective and diagrammatic view of another embodiment of a heat mat in accordance with the present disclosure with portions broken away to reveal that the heat mat includes an upper layer, a heating element including three electrical bus bars that may be used to establish no-heat, low-heat, and high-heat modes of operation, several parallel conductive threads, and a lower layer;

FIG. 20 is a diagrammatic view of the heat mat of FIG. 19 showing that the heat mat includes the outer layer, a heating element including several parallel conductive threads arranged to extend between an input electrical bus and an output electrical bus located, and an inner layer, and suggesting that the heating element is provided power from a power source controlled by a controller; and FIG. 21 is a diagrammatic view of another embodiment of a heated seat cushion in accordance with the present disclosure showing that the heated seat cushion includes, from top to bottom, seat-cushion trim including an upholstery layer, a reinforcement layer, and a foam layer, the heat mat, an adhesive, and a foam pad coupled to the heat mat by the adhesive and suggesting that the heat pad is provided power from a power source controlled by a controller.

DETAILED DESCRIPTION

A vehicle seat 10 in accordance with the present disclosure is shown in FIG. 1. Vehicle seat 10 includes a seat bottom 11 and a seat back 12 coupled to seat bottom 11 to extend upwardly away from seat bottom 11 as shown in FIG. 1. Seat bottom 11 includes an occupant-support base 13 embodied as a seat bottom as shown in FIG. 1. Occupant-support base 13 is configured to provide heat to an occupant sitting on vehicle seat 10 while minimizing the time required for the occupant to sense that heat is being applied through occupant-support base 13 while minimizing an amount of current applied to occupant-support base 13 from a power source 20.

Figure 2:
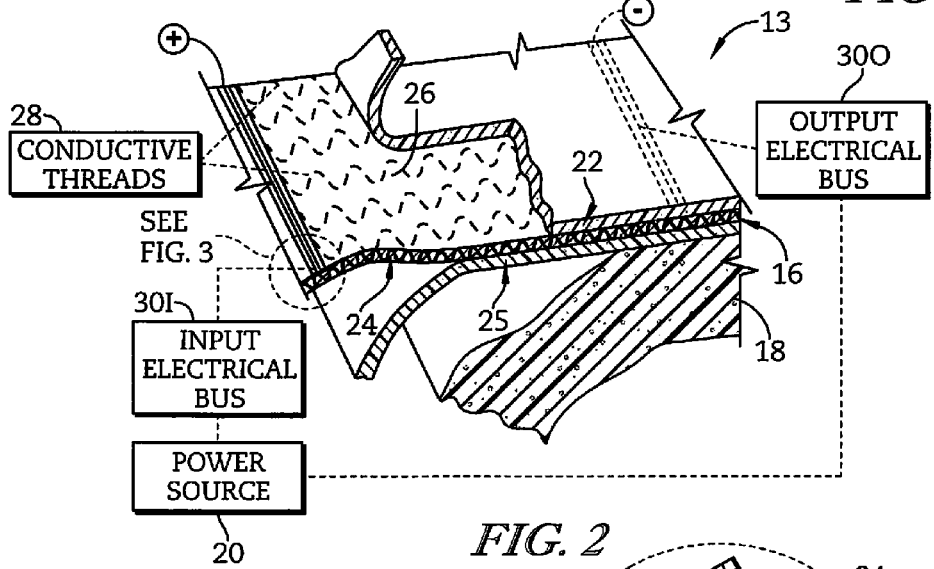

While occupant-support base 13 is shown as included in seat bottom 11, occupant-support base 13 may be included in seat bottom 11, seat back 12, or any combination thereof. Occupant-support base 13 includes a cushion cover 16 having a number of layers and a foam cushion 18 underlying cushion cover 16 as shown in FIG. 2.

Cushion cover 16, also called seat-cushion trim 16, includes conductive threads 28 and bus bars 30 that are woven into a layer of seat-cushion trim 16. Conductive threads 28 consume electrical energy to provide relatively high heat and high temperature to the occupant as a result of being located in close proximity to the occupant. Bus bars 30I, 30O transmit electric current while providing relatively little heat and a low temperature to occupant-support base 13 and the occupant. Conductive threads 28 extend between an input electrical bus bar 30I and an output electrical bus bar 30O. Power (sometimes called electrical energy) from a power source 20 is provided to input electrical bus bar 30I and transmitted through conductive threads 28 to output electrical bus bar 30O.

In the illustrative embodiment, conductive threads 28 and bus bars 30 are woven into scrim 26 included in a thermal-reinforcement layer 24 of seat-cushion trim 16. Conductive threads 28 are woven selectively into scrim 26 in areas where it is desired to provide relatively high heat to occupant-support base 13 and the occupant. Bus bars 30 are woven into scrim 26 to connect conductive threads 28 to power source 20 while minimizing heat provided to occupant-support base 13 in areas of desired low heat. Conductive threads 28 have a relatively high resistance while bus bars 30 have a relatively low resistance.

Figure 4:
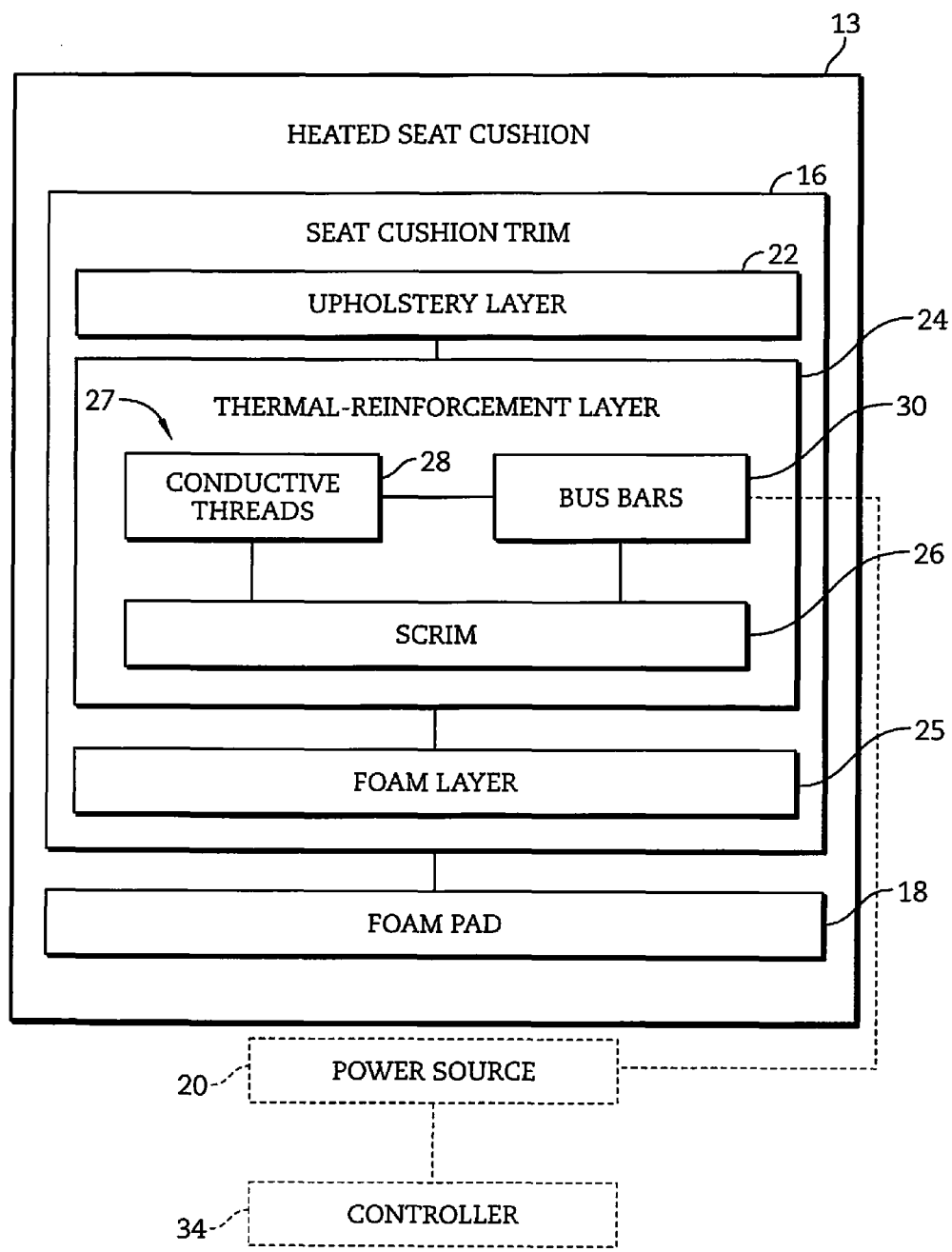

Occupant-support base 13 includes seat-cushion trim 16 and foam cushion 18 coupled to and underlying seat-cushion trim 16 as shown in FIG. 4. Seat-cushion trim 16 is arranged to provide a sitting surface for the occupant sitting on occupant-support base 13 and to provide heat to the occupant. Foam cushion 18 underlies seat-cushion trim 16 to support an occupant sitting on occupant-support base 13. A power source 20 provides power selectively to seat-cushion trim 16 to cause seat-cushion trim 16 to provide heat to the occupant. A controller 34 is coupled to power source 20. Controller 34 is arranged to receive an input and vary the power provided to seat-cushion trim 16 and, thus, vary the amount of heat produced by seat-cushion trim 16.

Figure 3:
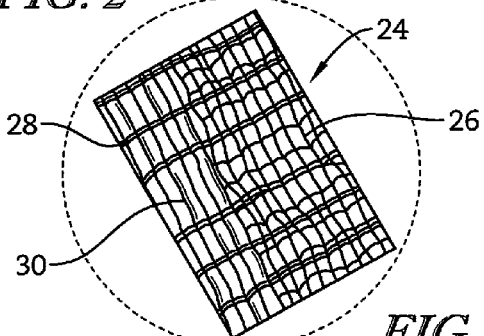

Seat-cushion trim 16 includes an upholstery layer 22 (upholstery sheet 22 or outer sheet 22), a thermal-reinforcement layer 24 (thermal sheet 24), and a foam layer 25 (inner sheet 25) as shown in FIG. 3. Upholstery layer 22 is arranged to stretch and deform in response to an occupant sitting on occupant-support base 13. Thermal-reinforcement layer 24 cooperates with upholstery layer 22 to limit deformation of upholstery layer 22. Thermal-reinforcement layer 24 also heats selectively the occupant through upholstery layer 22. Foam layer 25 is coupled to thermal-reinforcement layer 24 to provide seat-cushion trim 16 with a relatively soft tactile feel and pleasant appearance.

In the illustrative example, upholstery layer 22 is leather. In other embodiments, upholstery layer 22 is another material such as, for example, cloth, polyester, nylon, denim, elastane, artificial leather, or any other suitable alternative.

Thermal-reinforcement layer 24 includes scrim 26 and a heating unit 27. Heating unit 27 includes conductive threads 28 and bus bars 30I, 30O as shown in FIG. 4. Scrim 26 couples thermal-reinforcement layer 24 with upholstery layer 22 and blocks upholstery layer 22 from plastic deformation caused by an occupant sitting on occupant-support base 13. Conductive threads 28 are configured to provide a relatively high heat and high temperature to an occupant through upholstery layer 22. Bus bars 30 transmit power from power source 20 to conductive threads 28 and are configured to provide relatively little heat and low temperature to the occupant. Reference is hereby made to E.P. Appl. Pub. No. 1815717, filed Nov. 23, 2005 and titled METHOD FOR THE PRODUCTION OF A TEXTILE SURFACE-HEATING ELEMENT for disclosure relating to heating units, which application is hereby expressly incorporated by reference in its entirety herein. Reference is hereby made to U.S. Appl. Pub. No. 2013/0105459, filed Jan. 18, 2013 and titled SEAT COVER HEATING SYSTEM for disclosure relating to heating units, which application is hereby expressly incorporated by reference in its entirety herein.

Figure 5:
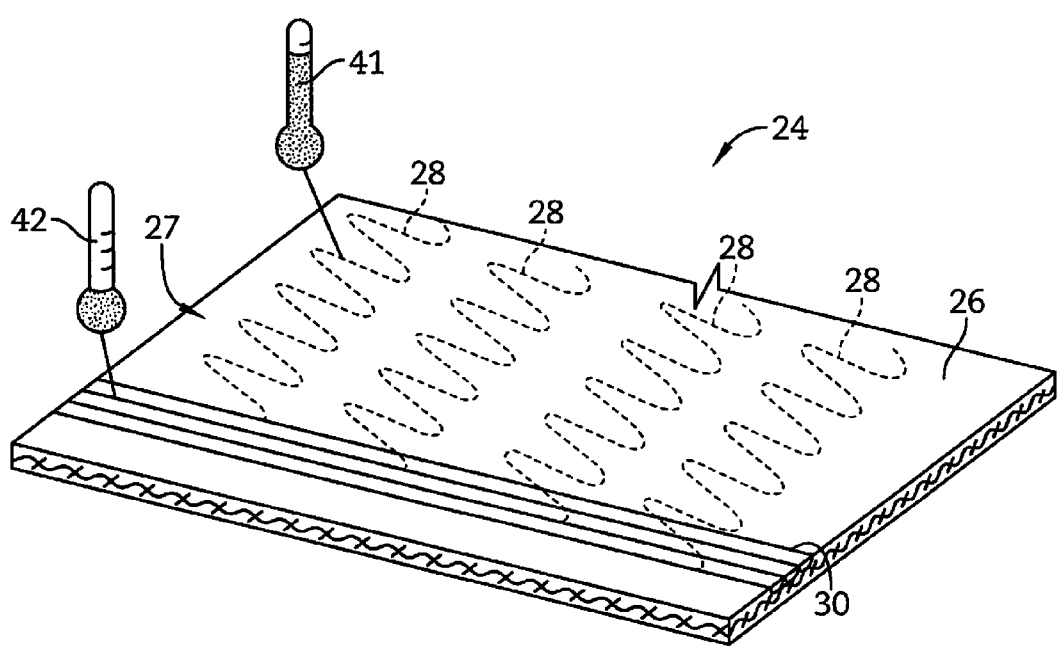
FIG. 5 is a diagrammatic view of a portion of the thermal-reinforcement layer of FIGS. 2 and 4 showing that the input electrical bus is configured to provide relatively little heat and a low temperature to the occupant while the conductive threads are configured to provide a relatively high heat and high temperature to the occupant.

Conductive threads 28 are woven into scrim 26 as shown in FIGS. 2, 3, and 5. In the illustrative embodiment, scrim 26 is a loosely-woven screen material as shown in FIGS. 3 and 7. In some embodiments, conductive threads 28 are integrated via a warp knit process. In other embodiments, conductive threads 28 are knitted in scrim 26. In other embodiments, conductive threads 28 are printed on scrim 26. Conductive threads 28 are free to move within scrim 26 when scrim 26 stretches such as, for example, when the occupant sits in occupant-support base 13 and causes seat-cushion trim 16 to deform. As a result, a force applied to conductive threads 28 is minimized. In the illustrative embodiment, scrim 26 limits the amount of movement (or stretch) of conductive threads 28.

Conductive threads 28 extend between an input electrical bus bar 30I and an output electrical bus bar 30O. Power from power source 20 is transmitted between input electrical bus bar 30I and output electrical bus bar 30O through conductive threads 28. Power transmitted through conductive threads 28 cause conductive threads 28 to produce heat.

In one example, conductive threads 28 are metallic. In another example, conductive threads 28 are made of stainless steel which provides increased strength and resistance to corrosion. In another example, conductive threads 28 are made from copper or any other suitable conductive metal. In another example, conductive threads are made of carbon fiber, graphene, or any other suitable material. In some embodiments, about 0.060 amps to about 0.10 amps are passed through each conductive thread 28.

Figure 6:
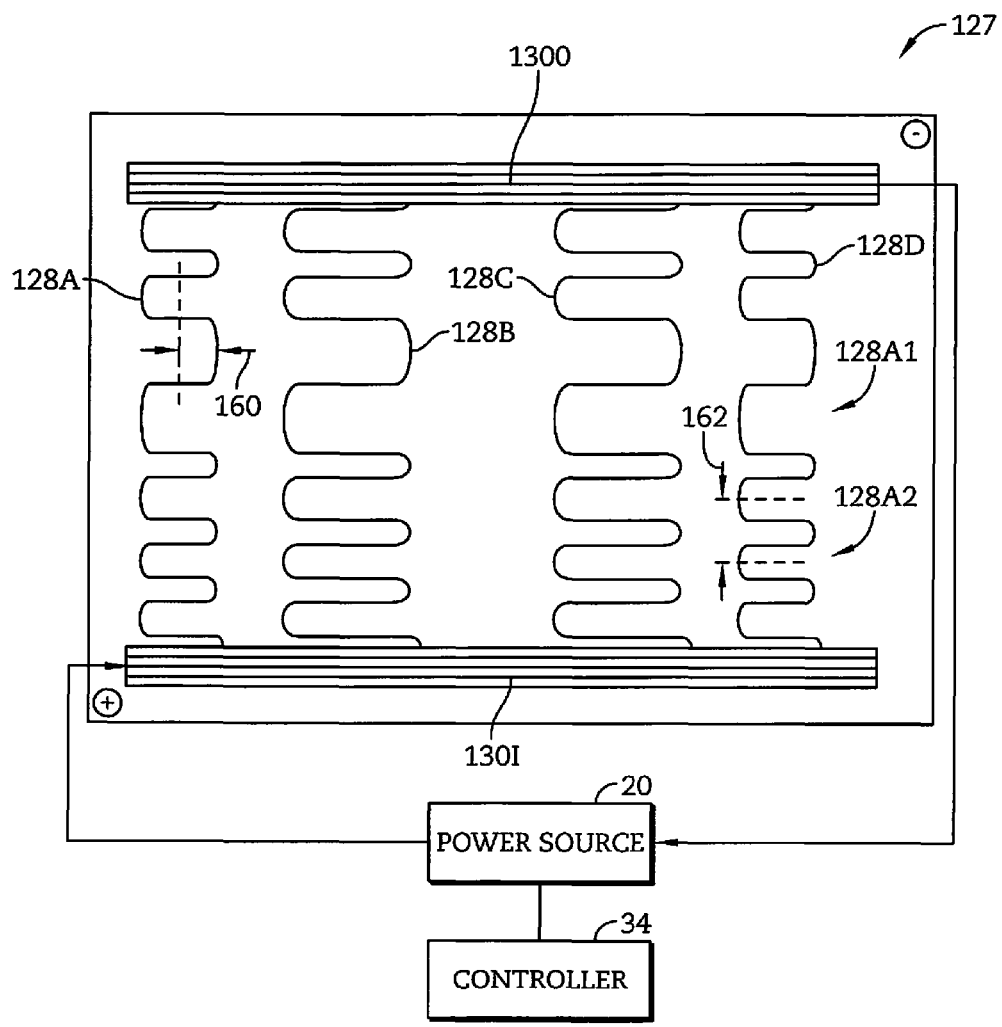
FIG. 6 is an elevation view of another embodiment of an electrical system configured to provide heat to an occupant resting on a heated seat cushion showing that the two conductive threads are arranged to be operated in parallel to one another.

In the illustrative embodiment, conductive threads 28 are connected in parallel to input electrical bus bar 30I and output electrical bus bar 30O as shown in FIGS. 6 and 7. As a result, if one conductive thread 28 breaks, the remaining unbroken conductive threads 28 continue to receive power and produce heat. The parallel arrangement of conductive threads 28 maximizes reliability of heating unit 27.

In the illustrative embodiment, conductive threads 28 are woven into scrim 26 in an oscillating path as shown in FIGS. 2 and 5. In other embodiments, conductive threads 28 are woven into scrim 26 in a linear path.

Input electrical bus bar 30I and output electrical bus bar 30O are woven into scrim 26 as shown in FIGS. 2, 3, 5, and 7. Electrical bus bars 30 conduct power between power source 20 and conductive threads 28. Electrical bus bars 30 provide relatively little heat and a low temperature to the occupant. Occupant-support base 13 may include a plurality of pairs of input and output electrical bus bars 30I, 30O.

As shown in FIG. 5, a first thermometer 41 measures a temperature of one conductive thread 28 while a second thermometer 42 measures a relatively lower temperature of input electrical bus bar 30I. The relatively higher temperature measured by first thermometer 41 is a result of conductive threads 28 being configured to have a resistance sufficient to provide heat when current is applied. The relatively lower temperature measured by second thermometer 42 is a result of input electrical bus bar 30O being configured so that little to no heat is provided when current is applied.

In operation, an occupant sits on occupant-support base 13 and provides an input to controller 34 to control an amount of heat provided by occupant-support base 13. Controller 34 varies an amount of power in a current transmitted between power source 20 and electrical bus bars 30. Power from power source 20 travels to input electrical bus bar 30I and through conductive threads 28. Conductive threads 28 consume power and provide relatively high heat and high temperature to the occupant through upholstery layer 22. The current continues to power source 20 through output electrical bus bar 30O.

As suggested in FIG. 1, an amp meter 36 indicates that heating unit 27 consumes relatively little current as a result of the parallel configuration of conductive threads 28. At the same time, a relatively high heat is output to the occupant as a result of conductive threads 28 being located relatively close to the occupant. A thermometer 38 indicates that a relatively high temperature is measured on an outer surface of occupant-support base 13 as shown in FIG. 1. In on example, the relatively high temperature is about between about 30 degrees Celsius and about 50 degrees Celsius. As shown in FIGS. 15-18, time, location, loading, and proximity of measurement may affect the relatively high temperature. A clock 40 also indicates that a time to thermal sensation is minimized because higher heat is transferred in closer proximity to the occupant as suggested in FIG. 1.

Another embodiment of a heating unit 127 in accordance with the present disclosure is shown, for example, in FIG. 6. Heating unit 127 includes four conductive threads 128A, 128B, 128C, 128D which are arranged in parallel to one another. Each conductive thread in provided an input electrical bus bar 130IA, 130IB and an associated output electrical bus 130OA, 130OB coupled to a power source 20.

Each conductive thread 128A, 128B, 128C, 128D includes a lower-density portion 128A1 and a higher-density portion 128A2 as shown in FIG. 1. In one example, lower-density portion 128A1 provides less heat to an area located thereabove then higher-density portion 128A2. In another example, higher-density portion 128A2 may be provided by increasing a number of conductive threads in a given area, increasing weave spacing as shown in FIG. 6, or any other suitable alternative. As a result of varying conductive thread density in a given portion of heating unit 127, heat may be maximized in certain locations such as above massage points, massage bladders, tension points, etc.

Conductive threads 128A, 128B, 128C, 128D are embodied as sinusoidal waves. Amplitude 160 of each wave in a conductive thread may be constant throughout or varied along the length of each conductive thread. A wavelength 162 may be constant or varied along the length of each conductive thread. Both amplitude 160 and wavelength 162 may be varied each conductive thread.

Another embodiment of a thermal layer 224 in accordance with the present disclosure is shown in FIG. 7. Thermal layer 224 includes a heating unit 227 and a woven material 226. In one example, woven material 226 is a reinforcing scrim, however, woven material may be any other suitable material. Heating unit 227 is coupled to woven material 226 to move therewith and provide heat when provided current from power source 20 at direction of controller 34.

Heating unit 227 includes an input electrical bus bar 230I, an output electrical bus bar 230O, and a plurality of conductive threads 228 as shown in FIG. 7. Output electrical bus bar 230O is substantially the same as input electrical bus bar 230I, and thus, only input electrical bus bar 230I is discussed in detail. Input electrical bus bar 230I is arranged to extend through woven material 226 as shown in FIG. 7. Input electrical bus bar 230I includes a first portion 230I1 which is woven through woven material 226 and a second portion 230I2 which is separate from and free to move relative to woven material 226.

Another embodiment of a heated seat cushion 313 in accordance with the present disclosure is shown in FIG. 8. Heated seat cushion 313 includes foam cushion 18 and seat-cushion trim 316 arranged to extend around and surround foam cushion 18. Seat-cushion trim 316 includes upholstery layer 22, a reinforcement layer 324, and a thermal-foam layer 325 as shown in FIG. 8.

Thermal-foam layer 325 includes heating unit 27 and foam material 344 as shown in FIGS. 8-10. In one example, electrical bus bars 330I, 330O, a plurality of conductive wires 328 are woven through foam material 344. In another example, foam material 344 is allowed to expand around and through heating unit 27. In still yet another example, heating unit 27 is coupled to an outer surface of foam material 344 by adhesive or other suitable alternatives.

In some embodiments, a thermal-foam layer in accordance with the present disclosure may have one or more reinforcing layers coupled thereto. In one example, a reinforcing layer may be coupled to an upper surface of the thermal-foam layer and be located between the thermal-foam layer and the upholstery layer. In another example, the reinforcing layer may be coupled to a lower surface of the thermal-foam layer and be located between the thermal-foam layer and the foam pad. In one example, the reinforcing layer may be a woven material, a non-woven material, a film sheet, stitching, or any other suitable alternative.

Another embodiment of a heated seat cushion 413 in accordance with the present disclosure is shown in FIG. 9. Heated seat cushion 413 includes foam cushion 18 and seat-cushion trim 416 arranged to extend around and surround foam cushion 18. Seat-cushion trim 416 includes upholstery layer 22 and thermal-foam layer 325 as shown in FIG. 9.

Another embodiment of a heated seat cushion 513 in accordance with the present disclosure is shown in FIG. 11. Heated seat cushion 513 includes foam cushion 18 and seat-cushion trim 516 arranged to extend around and surround foam cushion 18. Seat-cushion trim 516 includes a thermal-upholstery layer 522, reinforcement layer 324, and foam layer 25 as shown in FIG. 11.

Thermal-upholstery layer 522 includes heating unit 27 and upholstery material 544 as shown in FIGS. 11 and 12. Bus bars 30I, 30O, a plurality of conductive threads 28 are woven through upholstery material 544. In one example, upholstery material is a textile material. In another example, upholstery material is a material capable of having heating unit 27 woven there through. In another example, upholstery material is bonded leather, also called reconstituted leather or blended leather. Bonded leather may be a man-made upholstery material made as a layered structure of a fiber or paper backer, a pulp made from shredded leather, and a polyurethane coating which is embossed with a leather-like texture. In yet another example, upholstery material is bicast leather or coated leather which is made by splitting, shaving, or grinding leather to reduce its thickness and then laminating it to a backer substrate.

Another embodiment of a vehicle seat 610 in accordance with the present disclosure is shown in FIG. 13. Vehicle seat 610 includes a seat bottom 611 and a seat back 612 coupled to seat bottom 611 to extend upwardly away from seat bottom 611 as shown in FIG. 13. Seat bottom 611 includes a heated seat cushion 613 as shown in FIG. 13. Heated seat cushion 613 includes seat-cushion trim 116, a first heating unit 627A, a second heating unit 627B, and a bridge coupler 627C as shown in FIG. 13. First heating unit 627A is located in a front portion of seat bottom 611 and second heating unit 627B is located in a rear portion of seat bottom 611 in spaced-apart relation to first heating unit 627A. As shown in FIG. 13, time to thermal sensation, as measured by clock 640, is minimized while current provided to heating units 627A, 627B, as measured by amp meter 636, is minimized.

First heating unit 627A is coupled to second heating unit 627B by bridge coupler 627C as shown in FIG. 13. Bridge coupler 627C includes portions of an input electrical bus bar 630I and an output electrical bus bar 630O. While each heating unit 627A, 627B has individual and separate conductive threads, input and output electrical bus bars 630I, 630O are shared between first and second heating units 627A, 627B. As shown in FIG. 14, conductive threads 628 and portions 630A of electrical input bus bar 630I are woven through a material 624 included in seat-cushion trim 616. Other portions 630B of input electrical bus bars 630I are separated from material 624 and free of conductive threads 628. While only input electrical bus bar 630I is shown in FIG. 14, output electrical bus bar 630O is arranged similar to input electrical bus bar 630I.

In the example of FIG. 14, other portions 630B of electrical bus bars 630I, 630O are arranged to extend between through bridge coupler 627C of heated seat cushion 613. As a result of electrical bus bars 630I, 630O having relatively low resistance and low temperatures as measured by thermometer 638, electrical bus bars 630I, 630O may be located in areas with little to no ventilation such as when placed into seat pads below a sewn seam 656 as suggested in FIG. 13. In comparison, conductive threads 628 provide for relatively higher temperatures as measured by a thermometer 637 as shown in FIG. 13.

A heat mat 750 in accordance with the present disclosure is shown in FIGS. 19 and 20. Heat mat 750 includes an outer layer 752, an inner layer 754 spaced apart from outer layer 752, and a heating unit 727 located therebetween. Heating unit 727 is coupled to each layer 752, 754 by adhesive or any other suitable alternative. In another example, heating unit 727 is laminated to each layer 752, 754.

Outer layer 752 in one example is a polymeric material configured to block liquids from interacting with heating unit 727. Inner layer in one example is a polymeric material configured to block liquids from interacting with heating unit 727. Heating unit 727 includes conductive threads 728, input electrical bus bar 730I, and an output electrical bus bar 730O. In one example, a heat mat in accordance with the present disclosure may omit the inner layer or the outer layer leaving the heating unit 727 exposed.

Another embodiment of a heated seat cushion 813 in accordance with the present disclosure is shown, for example, in FIG. 21. Heated seat cushion 813 includes foam cushion 18, seat-cushion trim 816, and a heating unit 827 as shown in FIG. 21. Seat-cushion trim 816 is arranged to extend around and surround foam cushion 18. Seat-cushion trim 816 includes upholstery layer 22, a reinforcement layer 824, and a foam layer 25 as shown in FIG. 21.

Heating unit 827 includes heat mat 850 and an adhesive 852 as shown in FIG. 21. Heat mat 850 is coupled to foam cushion 18 in a fixed position relative to foam cushion 18 by adhesive 852. In on example, heating unit 827 may have included a release liner located in spaced-apart relation to heat mat 850 to locate adhesive therebetween. Prior to assembly, the release liner is removed form heating unit 827 exposing adhesive 852.

In another example, a heat mat may be coupled to a cushion cover using an Avery tag to salvage the heat mat to the cushion cover. However, any other suitable alternative may be used.

A heat mat 850 in accordance with the present disclosure is shown in FIG. 19A. Heat mat 850 includes an outer layer 852, an inner layer 854 spaced apart from outer layer 852, and a heating unit 827 located therebetween. Heating unit 827 is coupled to each layer 852, 854 by adhesive, weaving, or any other suitable alternative. In another example, heating unit 827 is laminated to each layer 852, 854.

Heating unit 827 includes conductive threads 828 and electrical bus bars 8301, 8302, and 8303. Heating unit 827 may be used in low-heat mode of operation, a high-heat mode of operation, and a no-heat mode of operation as suggested in FIG. 19A. During the no-heat mode of operation, no current flows through conductive threads 828 or electrical bus bars 8301, 8302, 8303. During the low-heat mode of operation, current flows from first electrical bus bar 8301 through conductive threads 828 and out third electrical bus bar 8303. Second electrical bus bar 8302 is open or not grounded when in the low-heat mode as suggested in FIG. 19A. During the high-heat mode, both first and third electrical bus bars 8301, 8303 provide current to conductive threads 828 which flows to second electrical bus bar 8301 as shown in FIG. 19A. Heating unit 827 may further includes a three way switch to move between the various modes of operation.

Trim in accordance with the present disclosure may be used with foam pads formed according to various techniques. In one example, trim including a heating unit, may be used as part of a cover carving technique in which the shape of the foam pad is controlled in part by the trim. Trim in this illustrative example includes an upholstery layer and thermal-reinforcement layer 24. In this example, scrim 26 is a woven material including relatively large holes allowing for interaction between foam pad and the upholstery material during the cover carving process.

In another example, trim including a heating unit, may be used as part of a foam-in-place technique used to establish a foam pad. Trim in this illustrative example includes an upholstery layer and thermal-reinforcement layer 24. In this example, scrim 26 is a woven material including relatively large holes allowing for the expanding liquid foam to move throughout scrim 26 and the heating unit to engage the upholstery material during the cover carving process.

Trim 16 (116) (316) (416) (516) (616) may be used in various other embodiments in accordance with the present disclosure. In one example, trim including a heating unit may be used without an associated foam cushion 18 in applications such as floor trim for a vehicle, a headliner for a vehicle, dashboard trim for a vehicle, a steering wheel cover, a gear-shift cover, or any other suitable use. In another example, trim including a heating unit may be used with an associated foam pad in areas with complex contours and shapes such as movable armrests, headrests, console covers, or any other suitable use.

FIG. 15 is a graph showing the temperature of the heated seat cushion of FIG. 1 located in a seat bottom over time in comparison with a baseline heated seat cushion while load is applied to the seat cushion. The baseline heated seat cushion is, for example, a seat cushion with a NISSAN L42L Cushion Leather heating pad provided by W.E.T. Automotive Systems Ltd. In comparison, the heated seat cushion of FIG. 1 provides more heat faster to the occupant over time and provides a faster time to initial sensation of 26 seconds.

FIG. 16 is a graph showing the temperature of the heated seat cushion of FIG. 1 located in a seat back over time in comparison with the baseline heated seat cushion while load is applied to the seat cushion. The baseline heated seat cushion is, for example, a seat cushion with a NISSAN L42L Cushion Leather heating pad provided by W.E.T. Automotive Systems Ltd. In comparison, the heated seat cushion of FIG. 1 provides more heat faster to the occupant over time and provides a faster time to initial sensation of 32 seconds.

FIG. 17 is a graph showing the temperature of the heated seat cushion of FIG. 1 located in the seat bottom over time in comparison with the baseline heated seat cushion without load being applied to the seat cushion. The baseline heated seat cushion is, for example, a seat cushion with a NISSAN L42L Back Leather heating pad provided by W.E.T. Automotive Systems Ltd. In comparison, the heated seat cushion of FIG. 1 provides more heat faster to the occupant over time.

FIG. 18 is a graph showing the temperature of the heated seat cushion of FIG. 1 located in the seat back over time in comparison with the baseline heated seat cushion without load being applied to the seat cushion. The baseline heated seat cushion is, for example, a seat cushion with a NISSAN L42L Back Leather heating pad provided by W.E.T. Automotive Systems Ltd. In comparison, the heated seat cushion of FIG. 1 provides more heat faster to the occupant over time.

The invention claimed is:

1. An occupant-support base comprising
   a seat pan,
   a cushion coupled to the seat pan, and
   a cushion cover coupled to the cushion and arranged to extend around the cushion and cooperate with the seat pan to define a cushion-receiving space therebetween, the cushion cover including an outer sheet located in spaced-apart relation to the cushion and a thermal sheet located between the outer sheet and the cushion and configured to provide means for supplying heat to an occupant supported by the occupant-support base in response to supplying a minimal amount of current to the thermal sheet so that an amount of time required for the occupant to sense that heat being communicated to the occupant through the outer sheet of the cushion is minimized,
   wherein the thermal layer includes a scrim, a plurality of conductive threads coupled to the scrim to move relative to the scrim, and an input electrical bus bar coupled to the scrim and arranged to interconnect the plurality of conductive threads and a power source to cause the minimal amount of current to be communicated between the power source and the plurality of conductive threads.

2. The occupant-support base of claim 1, wherein each conductive thread included in the plurality of conductive threads is arranged in parallel to every other conductive thread to cause about an equal amount of current to be supplied to each conductive thread.

3. The occupant-support base of claim 1, wherein the cushion cover further includes an inner layer coupled to the cushion and located between the cushion and the thermal sheet.

4. The occupant-support base of claim 1, wherein each thread included in the plurality of conductive threads has the minimal amount of current pass there through and the minimal amount of current is in a range of about 0.060 amps to about 0.10 amps.

5. The occupant-support base of claim 4, wherein the heat provided by the thermal sheet produces a temperature measured on an outer surface of the outer sheet of between about 30 degrees Celsius and about 50 degrees Celsius.

6. The occupant-support base of claim 1, wherein a first portion of the plurality of conductive threads are arranged together to cause establish a first thermal density, a second portion of the plurality of conductive threads are arranged to establish a different second thermal density, the first thermal density is configured to provide a first amount of heat, the second thermal density is configured to provide a second amount of heat, and the second amount of heat is greater than the first amount of heat.

7. The occupant-support base of claim 6, wherein the second portion of the plurality of conductive threads includes a greater number of the conductive threads than a number of threads included in the first portion.

8. The occupant-support base of claim 6, wherein each conductive thread included in the first portion of the plurality of conductive threads has a length less than a length of each conductive thread included in the second portion of the plurality of conductive threads.

9. The occupant-support base of claim 1, wherein each thread included in the plurality of conductive threads has a sinusoidal wave shape.

10. The occupant-support base of claim 9, wherein the sinusoidal wave shape has a constant amplitude and a constant wavelength.

11. The occupant-support base of claim 9, wherein the sinusoidal wave shape has a varying amplitude and a varying wavelength.

12. The occupant-support base of claim 1, wherein the thermal layer includes a foam material, a plurality of conductive threads coupled to the foam material, and an input electrical bus bar coupled to the foam material and arranged to interconnect the plurality of conductive threads and a power source to cause the minimal amount of current to be communicated from the power source to the plurality of conductive threads.

13. The occupant-support base of claim 12, wherein the foam material is arranged to extend around and through the plurality of conductive threads.

14. The occupant-support base of claim 1, wherein the thermal layer includes a foam material, a plurality of conductive threads coupled to the foam material, and an input electrical bus bar coupled to the foam material and arranged to interconnect the plurality of conductive threads and a power source to cause the minimal amount of current to be communicated from the power source to the plurality of conductive threads.

15. The occupant-support base of claim 1, wherein the thermal sheet includes a first heating unit, a second heating unit located in spaced-apart relation to the first heating unit, and a bridge coupler arranged to extend between and interconnect the first and second heating units to cause the minimal amount of current to flow from the first heating unit to the second heating unit.

16. The occupant-support base of claim 15, wherein the first heating unit includes a scrim, a plurality of conductive threads coupled to the scrim, and a first portion of an input electrical bus bar coupled to the scrim and arranged to interconnect the plurality of conductive threads and a power source to cause the minimal amount of current to be communicated from the power source to the plurality of conductive threads, the second heating unit includes a scrim, a plurality of conductive threads coupled to the scrim, and a second portion of the input electrical bus bar coupled to the scrim of the second heating unit and arranged to interconnect the plurality of conductive threads of the second scrim and the power source to cause the minimal amount of current to be communicated from the power source, through the first heating unit, and to the plurality of conductive threads of the second heating unit, and the bridge coupler includes a scrim and a third portion of the input electrical bus bar coupled to the scrim of the bridge coupler and arranged to interconnect the first portion of the input electrical bus bar and the second portion of the input electrical bus bar.

17. An occupant-support base comprising
a seat pan,
a cushion coupled to the seat pan, and
a cushion cover coupled to the cushion and arranged to extend around the cushion and cooperate with the seat pan to define a cushion-receiving space therebetween, the cushion cover including an outer sheet located in spaced-apart relation to the cushion and a thermal sheet located between the outer sheet and the cushion and configured to provide means for supplying heat to an occupant supported by the occupant-support base in response to supplying a minimal amount of current to the thermal sheet so that an amount of time required for the occupant to sense that heat being communicated to the occupant through the outer sheet of the cushion is minimized
wherein the thermal layer includes a scrim, a plurality of conductive threads coupled to the scrim to move relative to the scrim, and an input electrical bus bar coupled to the scrim and arranged to interconnect the plurality of conductive threads and a power source to cause the minimal amount of current to be communicated from the power source to the plurality of conductive threads,
wherein each conductive thread included in the plurality of conductive threads is arranged in parallel to every other conductive thread to cause about an equal amount of current to be supplied to each conductive thread,
wherein the thermal layer further includes an output electrical bus bar woven through the scrim, located in spaced-apart relation to the input electrical bus bar, and arranged to interconnect the plurality of conductive threads and a ground to cause the minimal amount of current to flow from the power source, through the input electrical bus bar, through the plurality of conductive, threads, through the output electrical bus bar, and to the ground, the input and output electrical bus bars have a first resistance configured to minimize heat generated as a result of the minimal current passing through them, and the plurality of conductive threads have a second resistance configured to maximize heat generated as a result of minimal current passing through them.

18. An occupant-support base comprising
a seat pan, a cushion coupled to the seat pan, and a cushion cover coupled to the cushion and arranged to extend around the cushion and cooperate with the seat pan to define a cushion-receiving space therebetween, the cushion cover including an outer sheet located in spaced-apart relation to the cushion and a thermal sheet located between the outer sheet and the cushion and configured to provide means for supplying heat to an occupant supported by the occupant-support base in response to supplying a minimal amount of current to the thermal sheet so that an amount of time required for the occupant to sense that heat being communicated to the occupant through the outer sheet of the cushion is minimized, wherein each conductive thread included in the plurality of conductive threads is arranged in parallel to every other conductive thread to cause about an equal amount of current to be supplied to each conductive thread, wherein the plurality of conductive threads and the input electrical bus bar are woven in the scrim.

19. An occupant-support base comprising a seat pan, a cushion coupled to the seat pan, and a cushion cover coupled to the cushion and arranged to extend around the cushion and cooperate with the seat pan to define a cushion-receiving space therebetween, the cushion cover including a reinforcement layer located in spaced-apart relation to the cushion, a foam layer located between the reinforcement layer and the cushion, and thermal sheet arranged to locate the reinforcement layer between the thermal sheet and the foam layer and configured to provide means for supplying heat to an occupant supported by the occupant-support base in response to supplying a minimal amount of current to the thermal sheet so that an amount of time required for the occupant to sense that heat being communicated to the occupant is minimized, wherein the thermal sheet includes an upholstery material, a plurality of conductive threads coupled to the upholstery material, and an input electrical bus bar coupled to the upholstery material and arranged to interconnect the plurality of conductive threads and a power source to cause the minimal amount of current to be communicated between the power source and the plurality of conductive threads.

* * * * *